(12) United States Patent
Moertelmaier (10) Patent No.: US 9,766,446 B2
(45) Date of Patent: Sep. 19, 2017

(54) MICROSCOPE ILLUMINATION SYSTEM (71) Applicant: Keysight Technologies, Inc., Minneapolis, MN (US)

(72) Inventor: Manuel Moertelmaier, Wels (AT)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/011,240

(22) Filed: Jan. 29, 2016

(65) Prior Publication Data

US 2016/0291305 A1 Oct. 6, 2016

Related U.S. Application Data

(60) Provisional application No. 62/140,369, filed on Mar. 30, 2015.

(51) Int. Cl.
| | |
|---|---|
| G02B 26/02 | (2006.01) |
| G02F 1/03 | (2006.01) |
| G02B 21/16 | (2006.01) |
| G02B 21/00 | (2006.01) |
| G02B 27/42 | (2006.01) |
| G02B 21/12 | (2006.01) |

(52) U.S. Cl.
CPC ......... *G02B 21/16* (2013.01); *G02B 21/0092* (2013.01); *G02B 21/12* (2013.01); *G02B 26/02* (2013.01); *G02B 27/425* (2013.01)

(58) Field of Classification Search
USPC ............................ 359/233, 245–279
See application file for complete search history.

(56) References Cited

U.S. PATENT DOCUMENTS

| | | | |
|---|---|---|---|
| 2005/0007671 A1* | 1/2005 | Onvlee | G02B 26/0841 359/626 |
| 2010/0099049 A1* | 4/2010 | Owa | G03F 7/70291 430/322 |

* cited by examiner

*Primary Examiner* — Mohammed Hasan (57) ABSTRACT

An illumination system and method for operating the same is disclosed. The illumination system includes a spatial light modulator (SLM), first and second optical systems, a controller and a mask. The SLM is positioned to receive an incident light beam. The first optical system images light leaving the SLM onto the mask that blocks part of the light. The second optical system images light leaving the mask onto a sample to be illuminated. The controller causes the SLM to display an SLM pattern that generates an illumination beam and a spurious light beam from the incident light beam, the illumination beam passing through the mask, wherein the mask includes a fixed part having a plurality of openings and a moveable part that moves in relation to the fixed part and that includes an opening.

20 Claims, 11 Drawing Sheets

MICROSCOPE ILLUMINATION SYSTEM

CROSS-REFERENCE TO RELATED PATENT APPLICATIONS

This application is a conversion of, and claims priority from, U.S. Provisional Patent Application 62/140,369 filed on Mar. 30, 2015, said patent application being incorporated by reference herein.

BACKGROUND

In fluorescence microscopy, a sample is labeled with a fluorescent dye, and then placed on the microscope using a sample holder. The sample holder positions the sample such that the front focal plane of the microscope's objective is coinciding with a region of the sample. The sample is then illuminated by one or more beams of light shining through the objective. In response, the fluorescent dye in the sample emits light that is usually at a wavelength that is substantially different from the wavelength of the illuminating light, and hence, the object stained by the dye can be distinguished from objects that did not absorb the dye. The microscope is configured such that light emitted by the sample is, by means of several lenses and mirrors, collected on a detector, typically a camera, which coincides with a plane that is conjugate to the objective focal plane mentioned above. This results in an image of the sample being formed on the detector.

There are a number of different fluorescence microscopy modes that are distinguished by the type of illumination. Different modes provide different advantages depending on the specific goals of the experiment in which the microscope is being used. Each type of illumination requires a different illumination pattern on the specimen. Typically, each illumination pattern corresponds to a different arrangement of optical elements for forming the desired illumination pattern on the specimen from a light source. The optical elements sometimes include a mask that selectively blocks some light from the source. Different patterns are characterized by different masks, and hence, in switching illumination patterns, the masks must be changed which necessitates keeping a collection of different masks, removing the existing mask and inserting a new mask.

SUMMARY

The present invention includes an illumination system and method for operating the same. The illumination system includes a spatial light modulator (SLM), first and second optical systems, a controller and a mask. The SLM is positioned to receive an incident light beam. The first optical system images light leaving the SLM onto the mask that blocks part of the light. The second optical system images light leaving the mask onto a sample to be illuminated. The controller causes the SLM to display an SLM pattern that generates an illumination light beam and a spurious light beam from the incident light beam, the illumination beam passing through the mask, wherein the mask includes a fixed part having a plurality of openings and a moveable part that moves in relation to the fixed part and that includes an opening. In one aspect of the invention, the incident light beam is a collimated linearly polarized light beam.

In another aspect of the invention the SLM pattern includes a pattern that diffracts part of the incident light beam to create the illumination beam. The SLM can be a transmissive SLM or a reflective SLM.

In yet another aspect of the invention, the opening in the moveable part is characterized by a distance from a reference point on the fixed part and wherein the reference point and the SLM pattern are determined by the controller in response to user input specifying one of a plurality of illumination modes, each mode corresponding to a different illumination pattern.

In another aspect of the invention, the fixed part of the mask includes a transparent slot and a plurality of openings, the moveable part moving in relation to the fixed part such that the moveable part covers the slot. The opening in the moveable part provides an opening in the mask characterized by a position that can be changed by changing the position of the moveable part in the slot. In one aspect, the openings in the fixed part are arranged in opposing pairs. Each pair is centered on a reference point on the fixed part. The slot is characterized by an axis that runs radially through the reference point, the moving part moving in a direction parallel to the axis.

In another aspect of the invention, the light leaving the SLM includes multiple light beams, and the mask blocks one of the multiple light beams.

In yet another aspect of the invention, the SLM pattern and the moveable part of the mask are configured such that light leaving the mask provides one of a plurality of predetermined illumination patterns, the one of the plurality of predetermined illumination patterns is determined by user input.

In still a further aspect of the invention, the one of the plurality of predetermined illumination patterns is adapted for total internal reflection microscopy, inclined illumination microscopy, two dimensional structured illumination microscopy (SIM), three dimensional SIM, or epifluorescence bright field microscopy.

DETAILED DESCRIPTION

The present invention includes a light source for illuminating specimens for viewing in a microscope or other instrument. The light source can provide a number of different illumination patterns depending on the settings of a mask and the programming of an SLM. The manner in which the present invention provides its advantages can be more easily understood with reference to FIG. 1, which illustrates the basic optical elements of a light source according to the present invention. Illumination system 10 illuminates an object at location 17. Light from a collimated linearly polarized light source 11, which is typically a laser, is split into one or more beams by SLM 12. The details of the beam or beams depend on the particular illumination pattern that is to be generated. SLM 12 is controlled from a controller 13 which is under the control, either directly or indirectly, of the user of the system. The light beams generated by SLM 12 are focused onto a mask 15 by a first lens assembly 14. Mask 15 has one or more openings through which the desired light beam or beams pass. The beam or beams leaving mask 15 are imaged by a second lens assembly 16 onto the specimen in the desired pattern.

Figure 1:
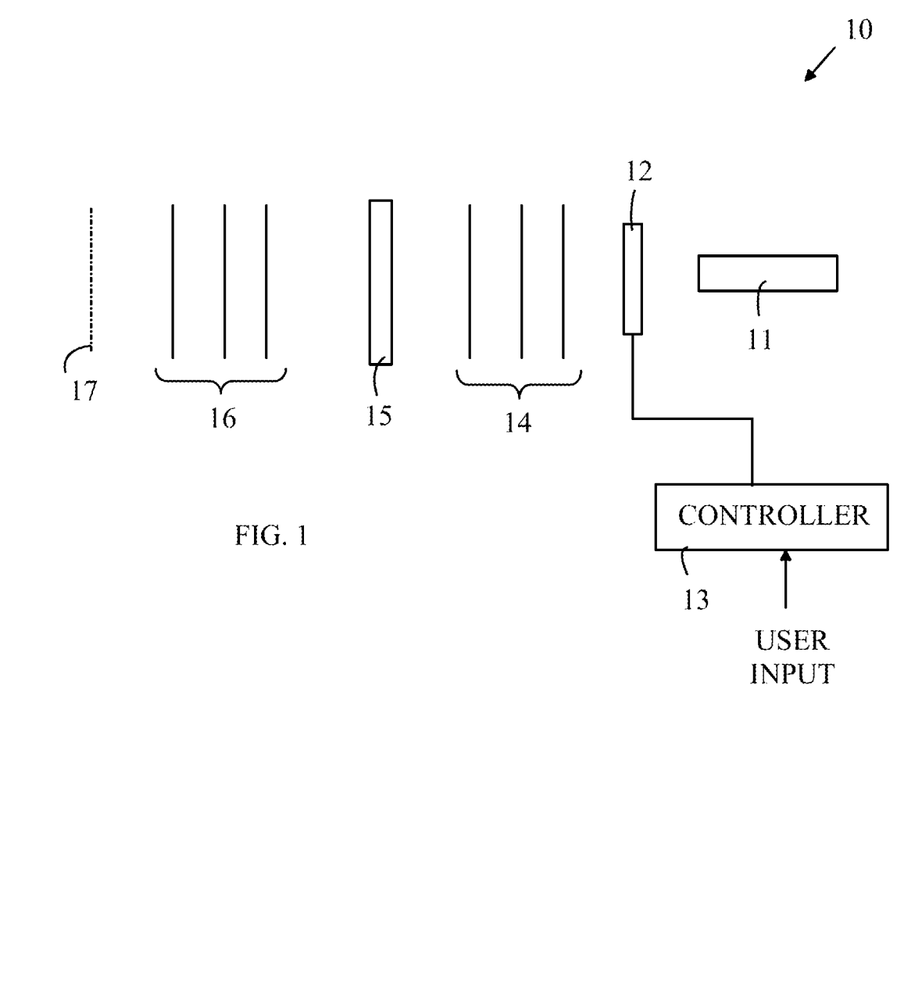
FIG. 1 illustrates the basic optical elements of a light source according to the present invention.
Figure 2:
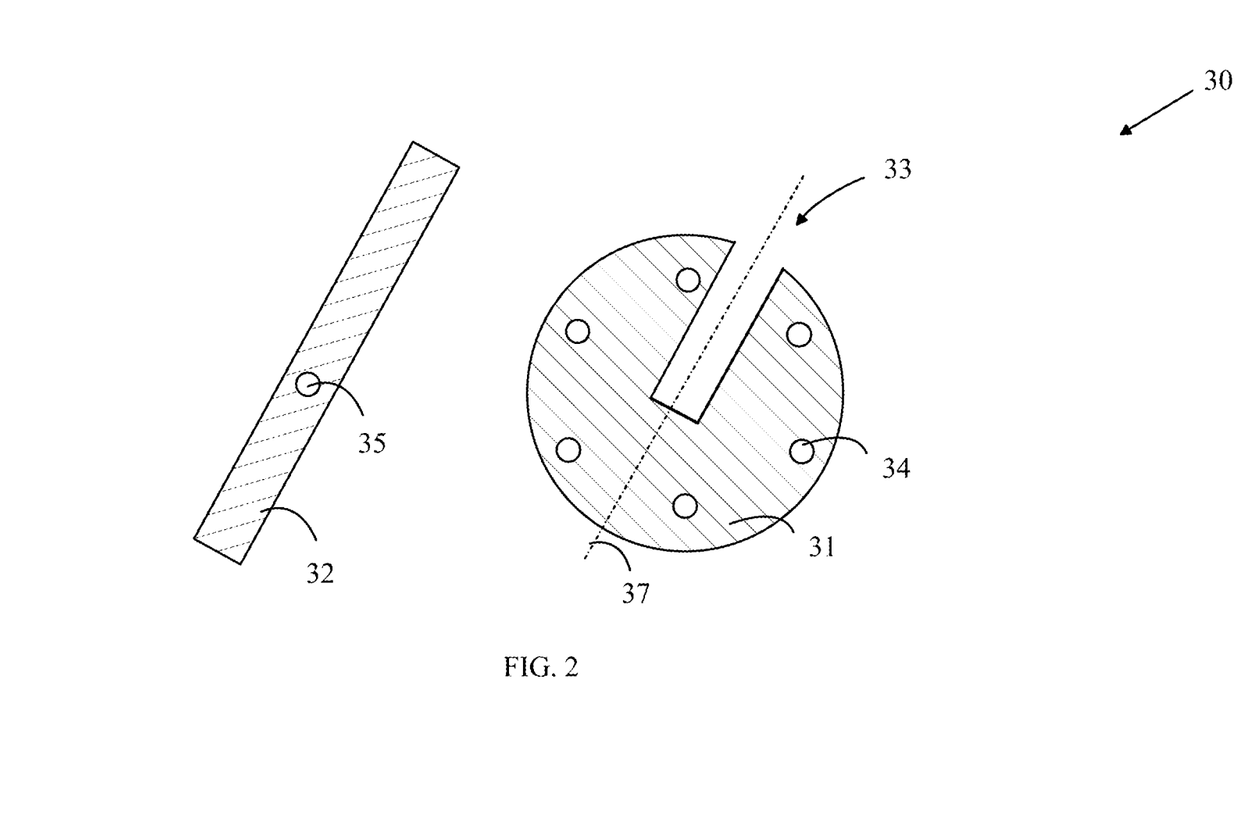
FIG. 2 is one embodiment of a mask that can be utilized in the arrangement shown in FIG. 1.

Refer now to FIG. 2, which is one embodiment of a mask that can be utilized in the arrangement shown in FIG. 1. Mask 30 has two parts that move with respect to one another. Disk 31 is a disk having a number of circular openings 34 disposed around the outer edge of disk 31 at a constant radius from the center of disk 31. The openings are arranged in three pairs of opposing apertures. The diameter of disk 31 is several millimeters in one embodiment, although different sizes could be utilized depending on the size of the optical elements shown in FIG. 1. Disk 31 also includes a slot 33 that extends beyond the center of disk 31 so that light can pass along a line through the center of disk 31.

Mask 30 also includes a moveable part 32 that has a width that is slightly larger than the width of slot 33. Moveable part 32 has one opening 35 that is positioned such that the combination of moveable part 32 and disk 31 can provide an opening along the axis 37 of slot 33 that can be positioned along a radius of disk 31 at any position between the center of disk 31 and the radius at which the circular openings 34 are placed. The mask also includes a linear actuator that moves moveable part 32 along axis 36 so that slot 33 is covered except for the location at which opening 35 is positioned.

Figure 3A:
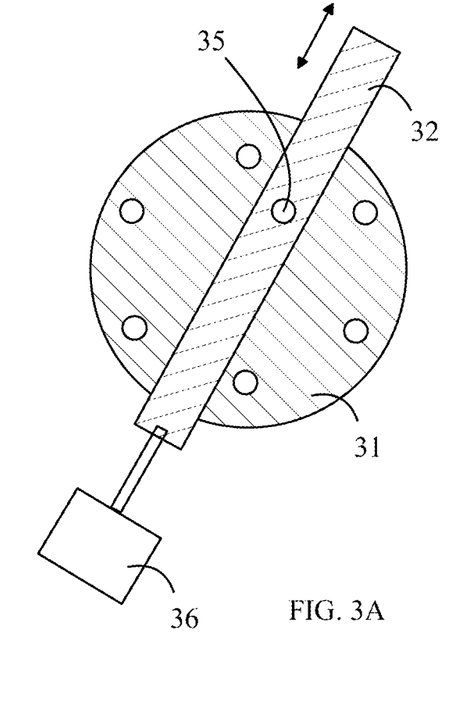
FIGS. 3A-3C illustrate various mask configurations that are obtained by positioning moveable part 32 relative to disk 31.
Figure 3B:
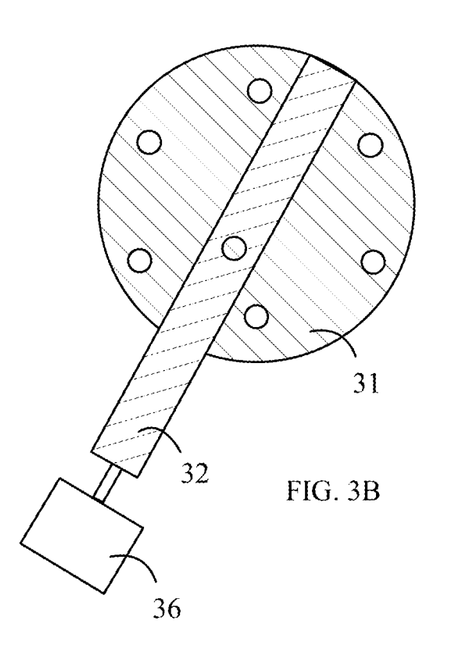
Figure 3C:
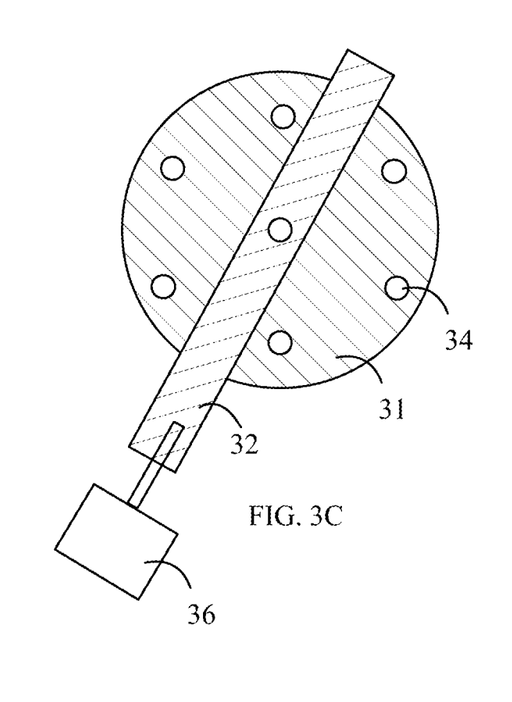

Refer now to FIGS. 3A-3C, which illustrate various mask configurations that are obtained by positioning moveable part 32 relative to disk 31. Referring to FIG. 3A, opening 35 of moveable part 32 is positioned at varying distances to the optical axis. In one aspect of the invention, a linear actuator 36 moves part 32 as shown by the arrows. Actuator 36 can be attached to a surrounding structure or to disk 31. This configuration is intended to be used with a pattern on the programmable light source that creates diffraction orders at positions such that one position coincides with the aperture of the movable part. This results in a single off-axis beam to pass through the mask. This configuration is utilized in total internal reflection fluorescence (TIRF) microscopy and inclined illumination configurations.

In TIRF microscopy, a single beam of illuminating light exits the objective at a substantial angle to the optical axis. The beam also exits the objective at a position that is shifted sideways such that the beam crosses the front focal plane of the objective at the intersection of this focal plane and the optical axis. This means that the illuminated region on the sample at this focal plane is centered on the optical axis. The advantage of TIRF microscopy is that it can reduce background signals.

In inclined illumination, a single beam is used in a mode similar to TIRF. However, the angle used is shallower. The beam may be smaller in diameter than the field of view of the microscope; however, other beam diameters could be utilized. Using a smaller diameter avoids illuminating light passing through the sample above and below the objective's focal plane. Such out-of-focus illuminating light rays can reduce the image contrast, as they can cause the background to fluorescence. In addition, the illuminating beam can be positioned sequentially at different lateral regions of the sample to achieve a complete coverage in illumination. Images are taken sequentially at each beam step. The advantage of this mode is that it reduces background signals.

Figure 4:
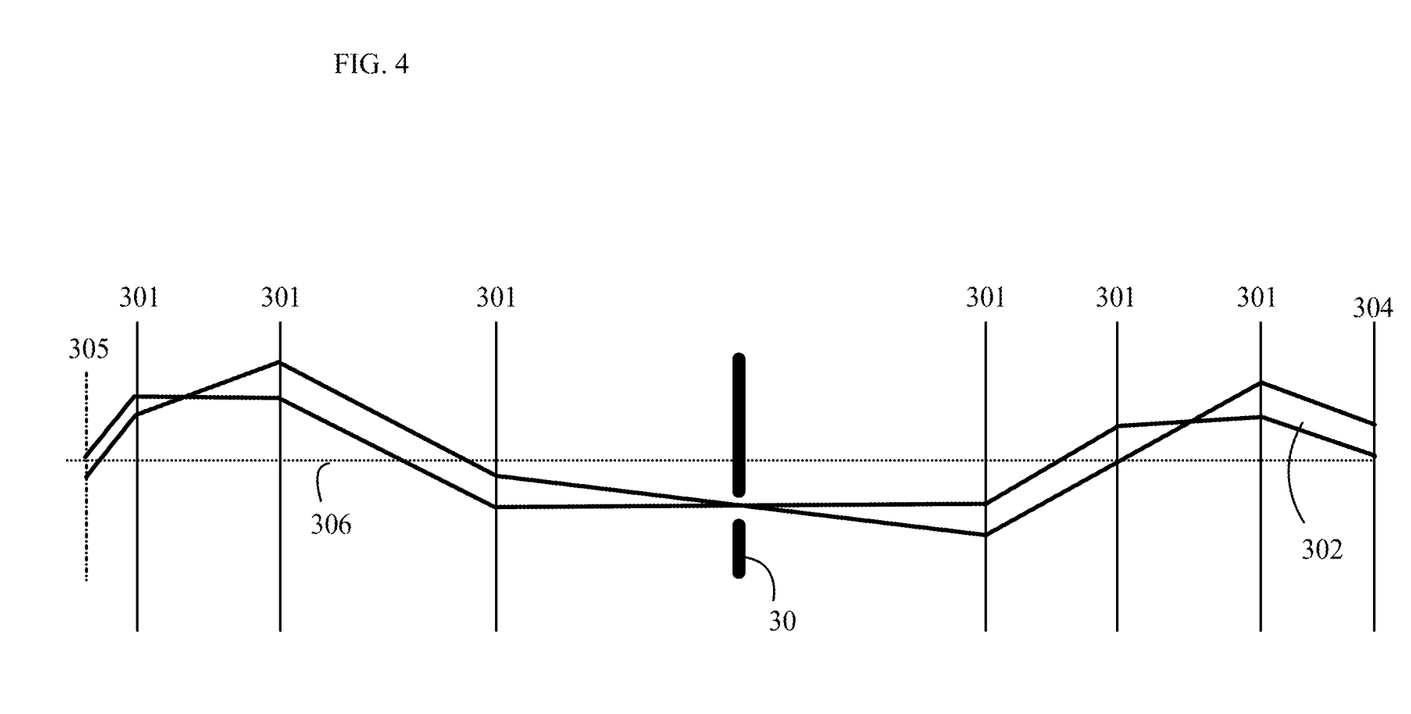
FIG. 4 illustrates a cross-sectional view of a microscope beam path for total internal reflection microscopy and inclined illumination microscopy.

Refer now to FIG. 4, which illustrates a cross-sectional view of a microscope beam path for TIRF and inclined illumination. A single beam of light 302 coming from a collimated light source 304 propagates at an angle to the optical axis 306 and is focused by several lenses 301. The beam passes through a mask 30 with moveable part 32 positioned to create an off-center aperture. Mask 30 also blocks stray light. Mask 30 also blocks unwanted light beams if the light source emits other unwanted beams at the same time at different angles. The beam exits the last (i.e. objective) lens as a collimated beam of a smaller diameter and intersects front focal plane 305 of the objective at an angle. It should be noted that it is the specific lens arrangement and not the mask that leads to the smaller beam diameter on the sample.

Refer now to FIG. 3B. Here, moveable part 32 is positioned such that opening 35 is covered by the underlying portion of disk 31 leaving only the three pairs of opposing apertures on the mask open. This configuration can be used in two dimensional SIM. Here, two beams exit the objective at two angles to the optical axis of opposing signs. Both beams are shifted sideways by individual distances such that the two beams intersect the front focal planes at a region centered on the optical axis. Again, this is to ensure that the illuminated region on the front focal plane is centered on the optical axis. The advantage of two dimensional SIM is that the pattern generated by the interference of the two beams can be used to increase the lateral resolution of the microscope.

Figure 5:
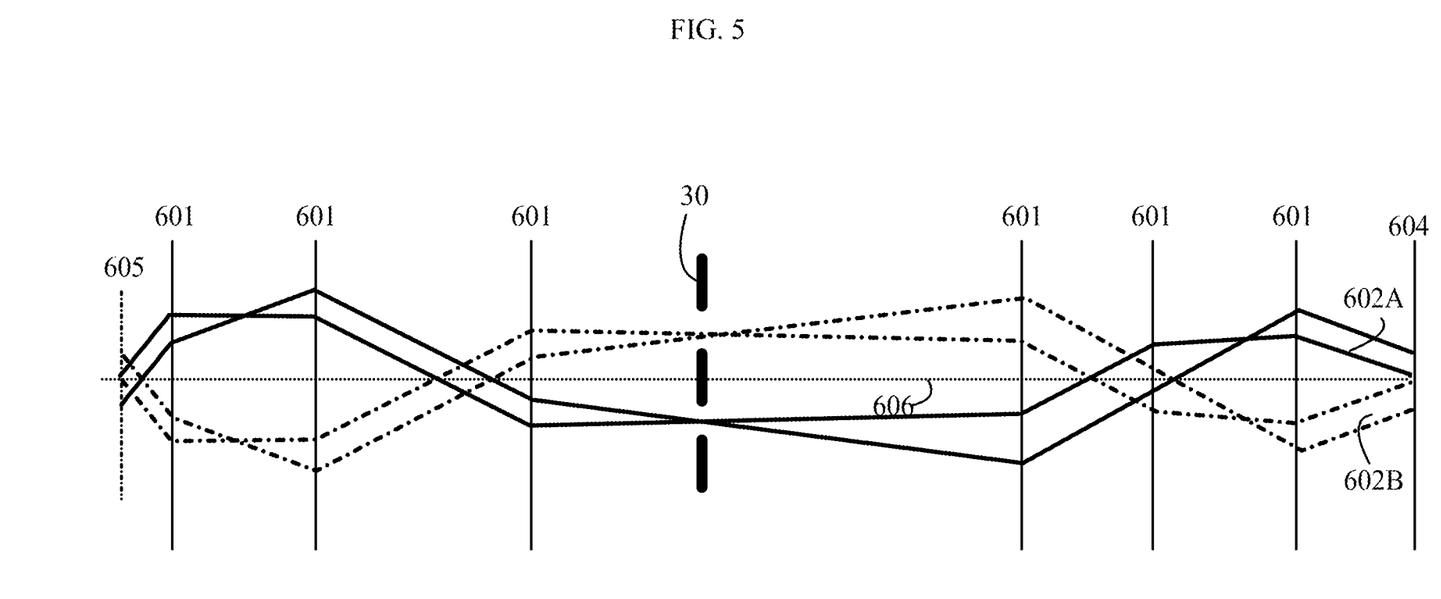
FIG. 5 illustrates a cross-sectional view of a microscope beam path for two dimensional SIM.

Refer now to FIG. 5, which illustrates a cross-sectional view of a microscope beam path for two dimensional SIM illumination. Two beams of light 602A and 602B coming from a collimated light source 604 propagate at an angle to the optical axis 606 and are focused by several lenses 601. The beams pass through mask 30 utilizing two off-center apertures. Mask 30 also blocks unwanted light beams if the light source emits other unwanted beams at the same time at different angles. The beams exit the last (i.e. objective) lens as two collimated beams of a smaller diameter and intersect the front focal plane 605 of the objective at an angle.

Refer now to FIG. 3C. In the third configuration moveable part 32 is positioned to provide a central aperture in the mask. This configuration can be used, depending on the pattern displayed on the programmable light source, either for bright field illumination or for three dimensional SIM. In epifluorescence bright field microscopy, the illuminating beam exits the objective along the optical axis, i.e. orthogonal to the front focal plane of the objective. The advantage of bright field microscopy is that it is simple and robust.

Figure 6:
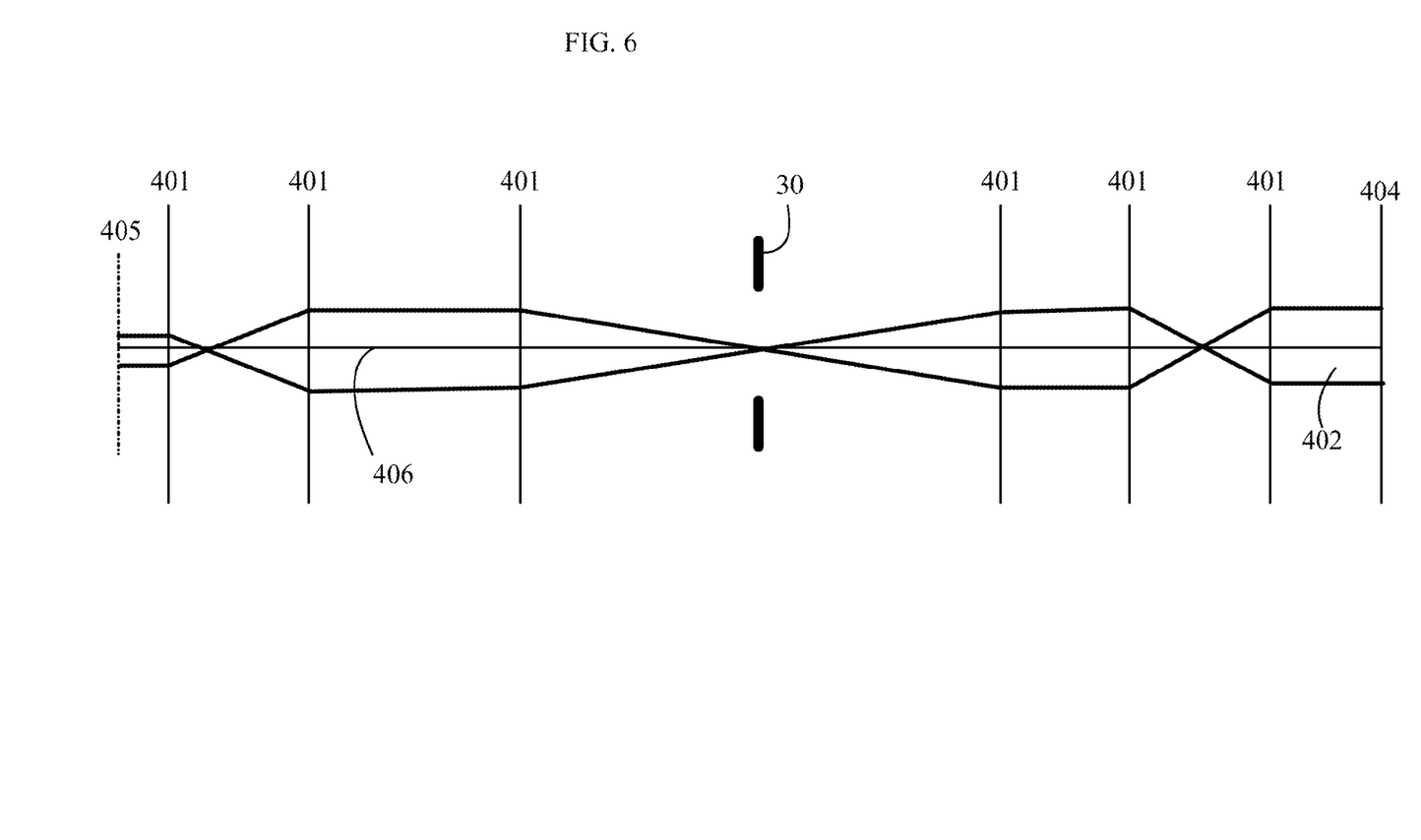
FIG. 6 illustrates a cross-sectional view of a microscope beam path for bright field epifluorescence microscopy.

Refer now to FIG. 6, which illustrates a cross-sectional view of a microscope beam path for bright field microscopy. A single beam of light 402 coming from a collimated light source 404 propagates along the optical axis 406 and is focused by several lenses 401. The beam passes through mask 30 which is configured to provide a central aperture. Mask 30 blocks stray light. The beam exits the last (i.e. objective) lens as a collimated beam of a smaller diameter and intersects the front focal plane 405 of the objective vertically.

In three dimensional SIM, two beams are configured in a manner similar to that used for two dimensional SIM, while a third beam is configured in the same manner as for bright field microscopy. The three beams interfere at the sample. The advantage of three dimensional SIM is that the resulting interference pattern can be used to increase the resolution of the microscope in all three dimensions.

Figure 7:
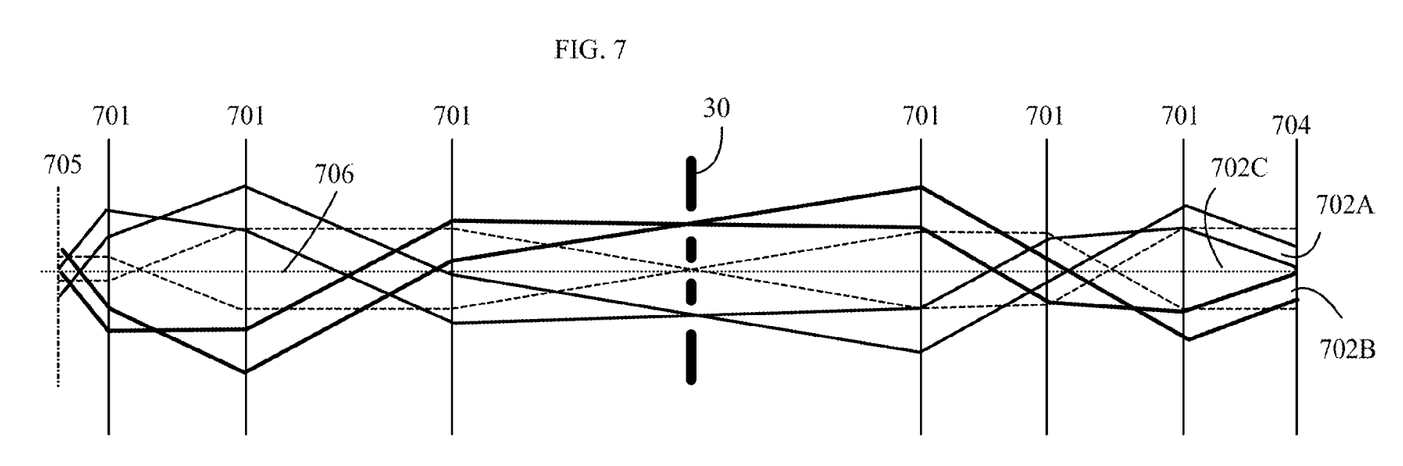
FIG. 7 illustrates a cross-sectional view of a microscope beam path for three dimensional SIM.

Refer now to FIG. 7, which illustrates a cross-sectional view of a microscope beam path for three dimensional SIM illumination. Here, the light source generates three beams of light 702A-702C. Beams 702A and 702B propagate at an angle with respect to optical axis 706. Beam 702C propagates parallel to optical axis 706. The beams are focused by lenses 701. The beams pass through mask 30 that is using two off-center apertures and one centered aperture formed by positioning moveable part 32 so that the aperture is centered on disk 31. Mask 30 blocks stray light and is also useful if the light source emits other unwanted beams at the same time at different angles. The beams exit the last (i.e. objective) lens 701 as three collimated beams of a smaller diameter and intersect the front focal plane 705 of the objective at an angle.

The above-described embodiments of the present invention utilize a mask having a fixed portion that is in the shape of a disk. However, other mask shapes having similarly placed openings could be utilized. It is the positions of the openings that provide the advantage, not the shape of the fixed and moveable parts.

Figure 8A:
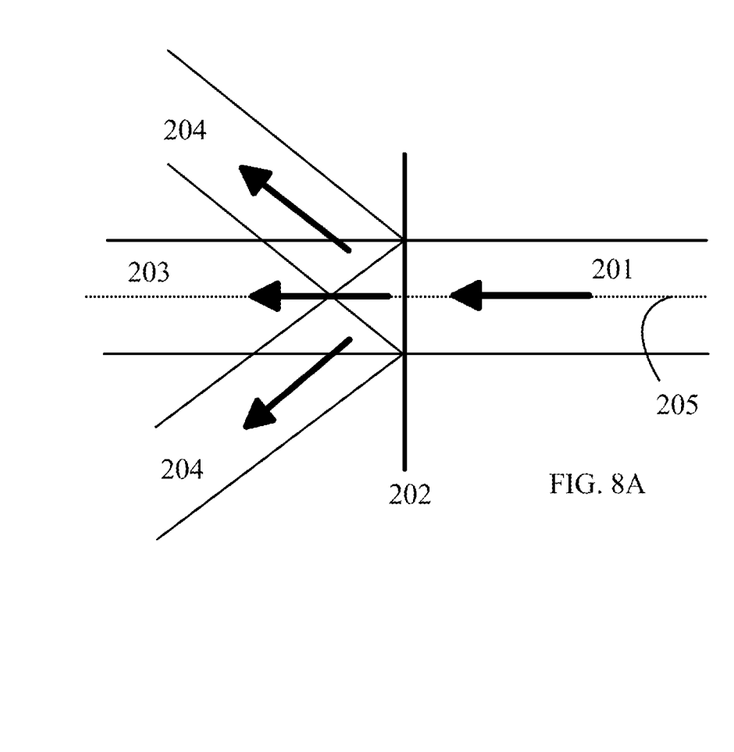
FIGS. 8A and 8B illustrate an exemplary light source according to one embodiment of the present invention.
Figure 8B:
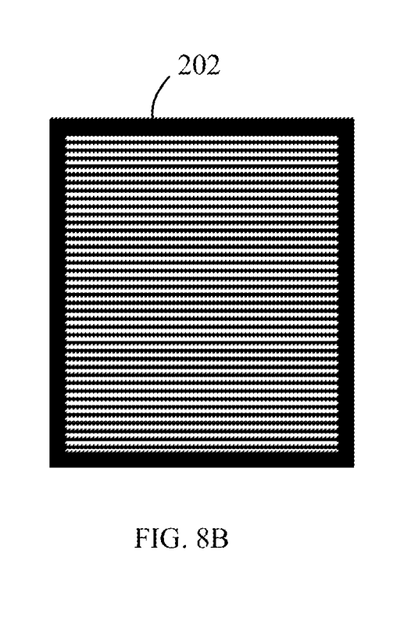

Refer now to FIGS. 8A and 8B, which illustrate an exemplary light source according to one embodiment of the present invention that can be used in the configurations described above. FIG. 8A is a cross-sectional view of a light beam processed by an SLM 202 and FIG. 8B is a front view of the pattern created on SLM 202. For the purposes of the present discussion a transmissive SLM is a device that imposes, on a beam of light that passes through the device, a set of localized shifts in phase, amplitude, or both. In contrast, a reflective SLM is a device that imposes, on a beam of light reflected off the device, a set of localized shifts in phase, amplitude or both. The SLMs, both reflective and transmissive, are usually segmented into a rectangular or square lattice of pixels. The phase and amplitude shifts are uniform over the region covered by an individual pixel, but can vary between pixels. The pixels' values for phase and amplitude shifts are addressable by software, and can vary at a frequency of at least several different values per second. Between the pixels may lie a "dead zone" that is not controllable by software and that may block or reflect or attenuate light at a constant rate.

Retelling to FIG. 8A, a collimated beam of coherent light 201 impacts SLM 202 positioned at a substantially vertical angle to the optical axis 205. The SLM can be programmed to provide a pattern of pixels in which each pixel introduces a particular phase shift into the light passing through that pixel. An example of a pattern that provides a diffraction grating is illustrated in FIG. 8B. In this pattern, horizontal stripes that introduce large phase shifts are shown as bright bands, alternating periodically with equally wide regions that impart small phase shifts, shown as dark bands. This pattern results in the SLM acting as an interference grating. Part of the collimated light impacting the SLM is diffracted as shown at 204. To simplify the drawing only the first diffraction orders are shown. Part of the collimated light gets transmitted to form beam 203, as the grating is finitely effective, and hence, not all of the light is diffracted. This light source can flexibly produce inclined beams at an angle dependent on the pattern displayed. By rotating the pattern on the SLM, the pairs of diffracted beams are also rotated around the optical axis. This is useful to create the rotated interference patterns on the sample as described for the SIM above. However, this source will always emit beams in pairs of opposite angles, and will always produce a beam parallel to the optical axis, necessitating the mask as described above.

Figure 9A:
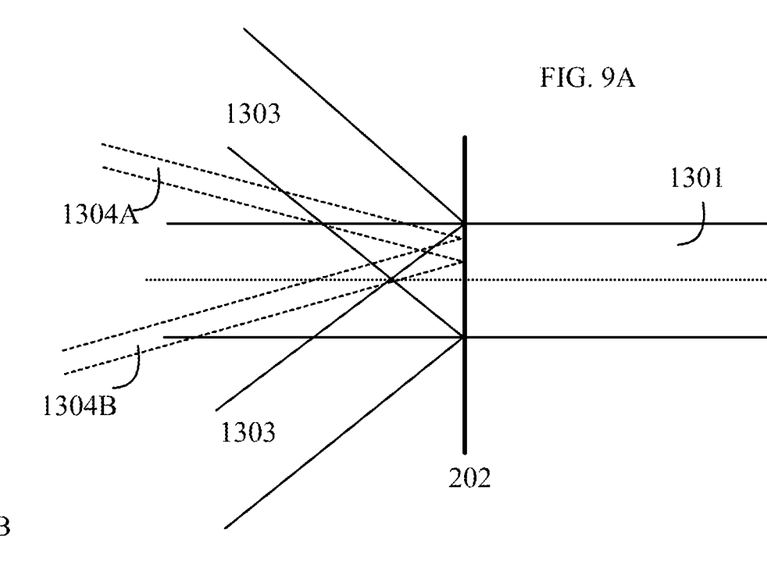
FIGS. 9A and 9B illustrate an SLM pattern for creating an inclined beam with a smaller, adjustable diameter that can be used in embodiments of the present invention to create inclined illumination.
Figure 9B:
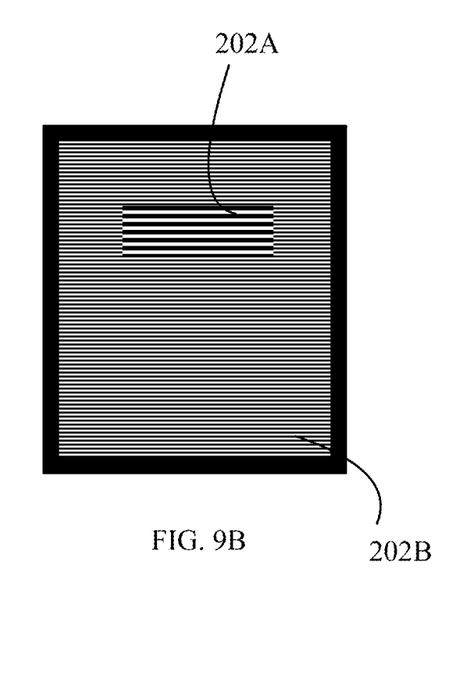

Refer now to FIGS. 9A and 9B, which illustrate an SLM pattern for creating an inclined beam with a smaller, adjustable diameter that can be used in embodiments of the present invention to create inclined illumination. As noted above, an inclined illumination arrangement requires a smaller beam that is positioned at multiple locations and which leaves the light source at an angle. The pattern of phase shifts shown in FIG. 9B displayed on the SLM 202 is separated in two regions. In the first region shown at 202A, the periodicity will be such that the diffraction angles will be suitable to allow light to pass through the off-axis aperture of the mask through the opening in the moveable part 32 as illustrated in FIG. 3A. This region creates the two beams shown at 1304A and 1304B from input beam 1301. These beams have smaller diameters than input beam 1301. The offset of the beams relative to the center line of input beam 1301 is determined by the offset of region 202A relative to the center line of input beam 1301. In region 202B, the periodicity of the pattern is smaller than that of region 202A, resulting in a steeper diffraction angle. This region produces the two beams shown at 1303. These beams will be stopped by mask 30. SLM 202 is positioned in a plane in the microscope conjugate to the sample plane; hence, the two regions will correspond to two regions on the sample. Therefore, if this pattern is used in conjunction with a mask as described above, the size of the two regions determines which part of the sample will be illuminated by an inclined beam. By reprogramming the SLM, different illuminating beams of arbitrary size, shape, and position can be obtained.

Figure 10A:
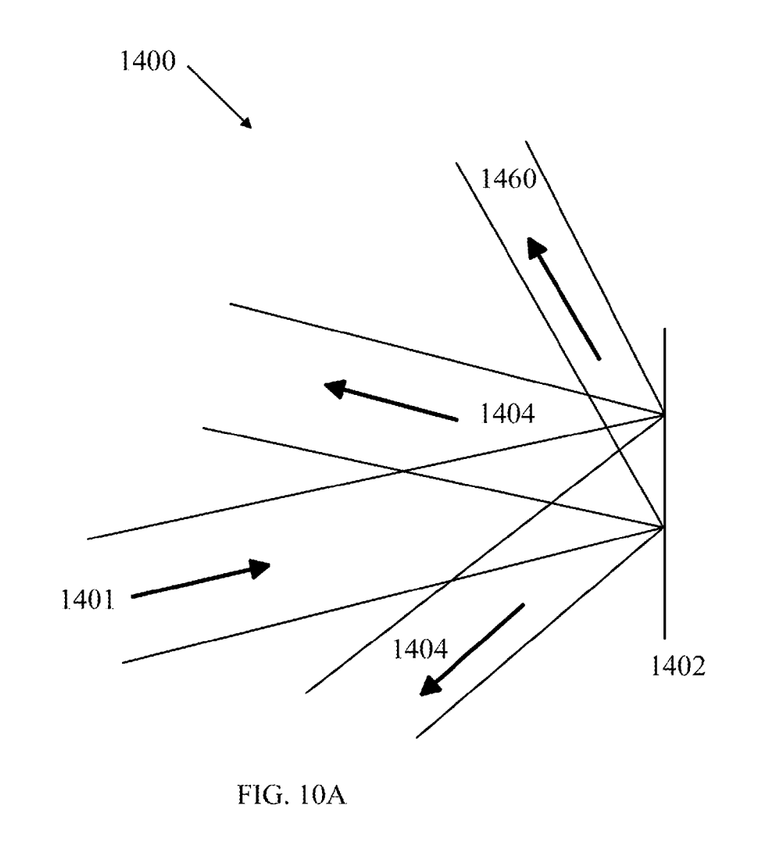
FIGS. 10A and 10B illustrate another exemplary light source according to one embodiment of the present invention.
Figure 10B:
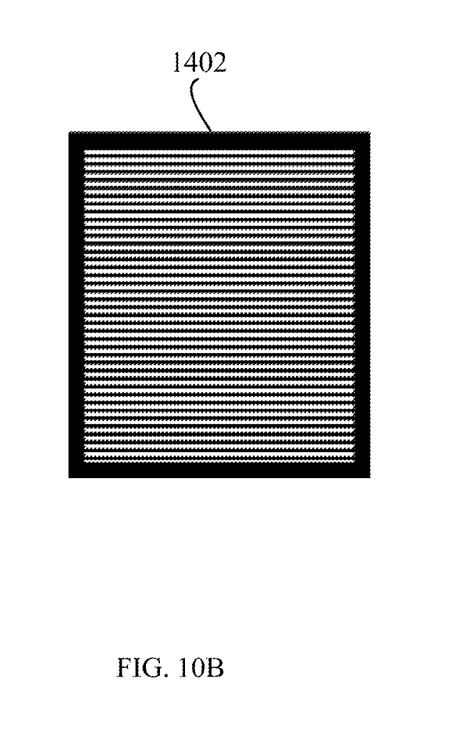

In the above-described embodiments the SLM is shown as a conductive structure in which the incident light is directed into the SLM from one side and part of the light that passes through the SLM is utilized. However, embodiments which utilize a reflective SLM can also be constructed. In such embodiments, the incident light is directed to the SLM from one side and the light source is arranged to create a collimated light beam that is diffracted by the SLM to create a plurality of light beams that are reflected from the SLM and that enter lens assembly 14. Refer now to FIGS. 10A and 10B, which illustrate another embodiment of a light source according to the present invention. FIG. 10A is a cross-section view of light source 1400, and FIG. 10B is an end view of SLM 1402 shown in FIG. 10A. Light source 1400 utilizes a reflective SLM to provide the light beams shown in FIG. 8A. Refer now to FIG. 10A. The incoming light beam 1401 is reflected from a reflective SLM 1402 that has the diffraction grating pattern shown in FIG. 10B. The incoming light is diffracted into beams 1460 and 1404. Beam 1460 being a reflected beam that is not diffracted, and analogous to beam 203 shown in FIG. 8A.

Figures 11A, 11B:
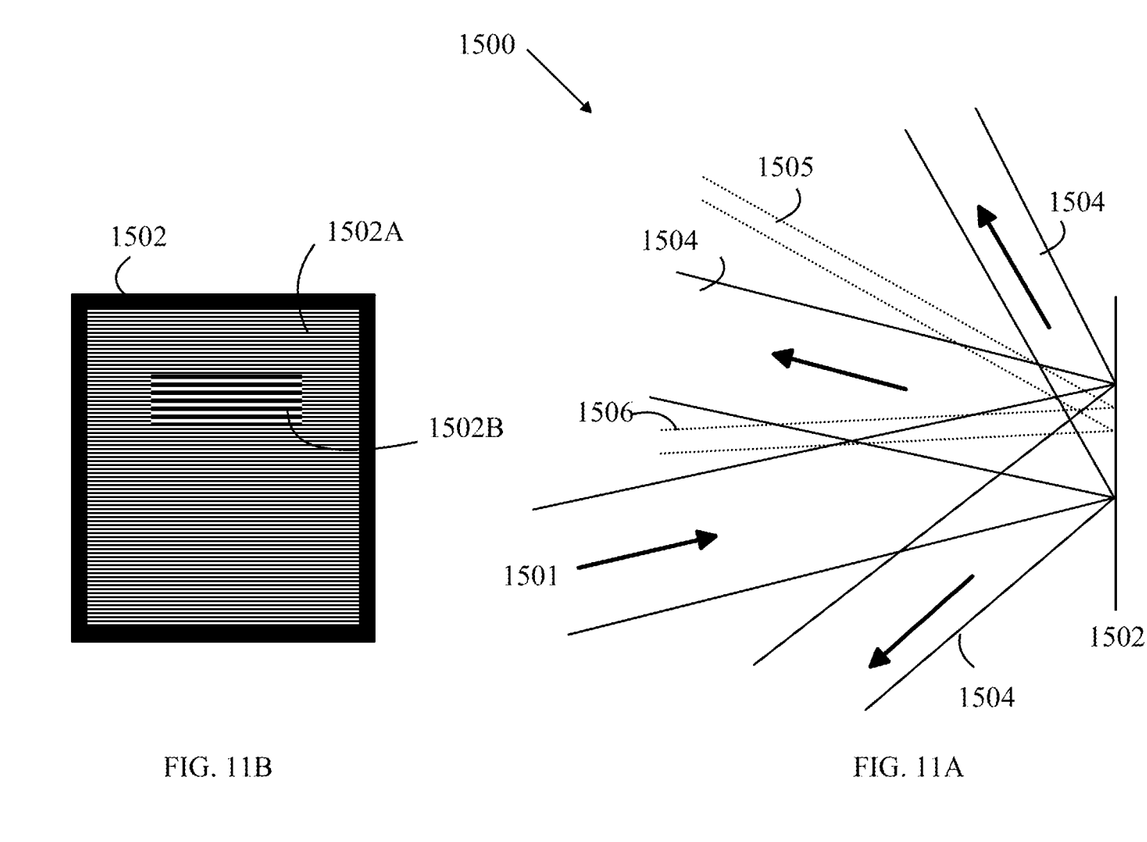
FIGS. 11A and 11B illustrate another SLM pattern for creating an inclined beam with a smaller, adjustable diameter that can be used in embodiments of the present invention to create inclined illumination.

Refer now to FIGS. 11A and 11B, which illustrate another embodiment of a light source according to the present invention. FIG. 11A is a cross-section view of light source 1500, and FIG. 11B is an end view of SLM 1502 shown in FIG. 11A. Light source 1500 utilizes a reflective SLM to provide the light beams shown in FIG. 9A. Refer now to FIG. 11A. The incoming light beam 1501 is reflected from a reflective SLM 1502 that has the diffraction grating pattern shown in FIG. 11B. The incoming light is diffracted into beams 1504 by the portion of the pattern shown at 1502A. The portion of the pattern shown at 1502B generates light beams 1505 and 1506.

While the above embodiments utilize an SLM that is programmed to provide a diffraction grating, other patterns could be utilized. Any pattern that provides the multiple beams discussed above could, in principle, be utilized. In addition, it should be noted that the pattern on the SLM need not be rectangular. It should also be noted that SLMs that introduce changes in intensity as well as changes in phase could also be utilized.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An illumination system comprising:
   a spatial light modulator (SLM) positioned to receive an incident light beam;
   a first optical system that images light leaving said SLM on a mask that blocks part of said light;
   a second optical system that images light leaving said mask onto a sample to be illuminated; and
   a controller that causes said SLM to display an SLM pattern that generates an illumination beam and a spurious light beam from said incident light beam, said illumination beam passing through said mask, wherein said mask comprises a fixed part having a plurality of openings and a moveable part that moves in relation to said fixed part and that includes an opening.

2. The illumination system of claim 1 wherein said incident light beam is a collimated linearly polarized light beam.

3. The illumination system of claim 1 wherein said SLM pattern comprises a pattern that diffracts part of said incident light beam to create said illumination beam.

4. The illumination system of claim 1 wherein said SLM comprises a transmissive SLM.

5. The illumination system of claim 1 wherein said SLM comprises a reflective SLM.

6. The illumination system of claim 1 wherein said opening in said moveable part is characterized by a distance from a reference point on said fixed part and wherein said reference point and said SLM pattern are determined by said controller in response to user input specifying one of a plurality of illumination patterns.

7. The illumination system of claim 1 wherein said fixed part of said mask comprises a transparent slot and a plurality of openings, said moveable part moving in relation to said fixed part such that said moveable part covers said slot, said opening in said moveable part providing an opening in said mask characterized by a position that can be changed by changing the position of said moveable part in said transparent slot.

8. The illumination system of claim 7, wherein said openings in said fixed part are arranged in opposing pairs, each pair being centered on a reference point on said fixed part and wherein said slot is characterized by an axis that runs radially through said reference point, said moving part moving in a direction parallel to said axis.

9. The illumination system of claim 1 wherein light leaving said SLM comprises multiple light beams and wherein said mask blocks one of said multiple light beams.

10. The illumination system of claim 1 wherein said SLM pattern and said moveable part of said mask are configured such that light leaving said mask provides one of a plurality of predetermined illumination patterns, said one of said plurality of predetermined illumination patterns being determined by user input.

11. The illumination system of claim 10 wherein one of said plurality of predetermined illumination patterns is adapted for total internal reflection microscopy.

12. The illumination system of claim 10 wherein one of said plurality of predetermined illumination patterns is adapted for inclined illumination microscopy.

13. The illumination system of claim 10 wherein one of said plurality of predetermined illumination patterns is adapted for two dimensional structured illumination microscopy.

14. The illumination system of claim 10 wherein one of said plurality of predetermined illumination patterns is adapted for three dimensional structured illumination microscopy.

15. The illumination system of claim 10 wherein one of said plurality of predetermined illumination patterns is adapted for epifluorescence bright field microscopy.

16. A method for operating an apparatus to illuminate a sample, said method comprising:
   directing an incident light beam onto a SLM to generate an illumination light beam and a spurious light beam, said SLM displaying an SLM pattern;
   imaging said illumination light beam on a mask that blocks part of said spurious light beam while passing said illumination light beam; and
   imaging light leaving said mask onto said sample,
   wherein said mask comprises a fixed part having a plurality of openings and a moveable part that moves in relation to said fixed part and that includes an opening, said moveable part being positioned relative to said fixed part in a manner determined by one of a predetermined plurality of illumination modes.

17. The method of claim 16 wherein said SLM pattern diffracts part of said incident light beam to create said illumination beam.

18. The method of claim 16 wherein said SLM comprises a transmissive SLM.

19. The method of claim 16 wherein said SLM comprises a reflective SLM.

20. The method of claim 16 wherein said opening in said moveable part is characterized by a distance from a reference point on said fixed part and wherein said reference point and said SLM pattern are determined by user input specifying said one of said plurality of illumination modes.

* * * * *